United States Patent [19]

Wysocki et al.

[11] Patent Number: 5,038,881
[45] Date of Patent: Aug. 13, 1991

[54] REVERSE-SHIFT MECHANISM FOR SNOWMOBILES

[75] Inventors: Timothy Wysocki; Byron Danielson, both of Roseau, Minn.

[73] Assignee: Polaris Industries, L. P., Roseau, Minn.

[21] Appl. No.: 499,597

[22] Filed: Mar. 23, 1990

[51] Int. Cl.$^5$ .................. B62M 27/02; F16C 1/10
[52] U.S. Cl. ..................... 180/184; 180/336; 74/342; 74/502.2
[58] Field of Search ............... 180/335, 336, 180, 181, 180/182, 183, 184, 185, 334, 316; 74/501.5 R, 473 P, 502.2, 342, 343, 355, 487, 502

[56] References Cited

U.S. PATENT DOCUMENTS

| | | | |
|---|---|---|---|
| 2,299,563 | 10/1942 | Carlson et al. | 74/355 |
| 2,854,857 | 10/1958 | Gleasman | 74/489 |
| 3,752,014 | 8/1973 | Holtan | 74/333 |
| 4,113,069 | 9/1978 | Craft et al. | 188/72.7 |
| 4,325,267 | 4/1982 | Kojima | 74/489 |
| 4,497,220 | 2/1985 | Grinde | 74/342 |
| 4,502,353 | 3/1985 | Beaudoin | 74/792 |
| 4,523,491 | 6/1985 | Dittmann, Jr. | 74/360 |
| 4,844,227 | 7/1989 | Crawford et al. | 192/3.54 |

OTHER PUBLICATIONS

Page from sales brochure for a Super Jag TM snowmobile (photograph).
Arctco publication with instructions for installation of a reverse kit on a snowmobile, pp. 4 and 3.
Exploded view of a 2-speed gear box with rigid control lever, Safari TM, sales publication.

Primary Examiner—Charles A. Marmor
Assistant Examiner—Victor E. Johnson
Attorney, Agent, or Firm—Gregory P. Kaihoi; Edward S. Hotchkiss

[57] ABSTRACT

The present invention provides a snowmobile with a reverse-shift lever. A shift cable extends between a transmission which is shiftable from a forward condition to a reverse condition and a lever means of the invention. The lever means is mounted on the snowmobile and includes a lever arm having first and second sides which may be moved from a first, forward position displaying its first side and second, reverse position displaying its second side. So moving the lever arm causes the cable to move, thereby shifting the transmission between its forward and reverse conditions. The first side of the lever arm may include an indicator indicating a forward condition of the transmission and the second side of the lever arm may be provided with an indicator indicating a reverse condition.

12 Claims, 5 Drawing Sheets

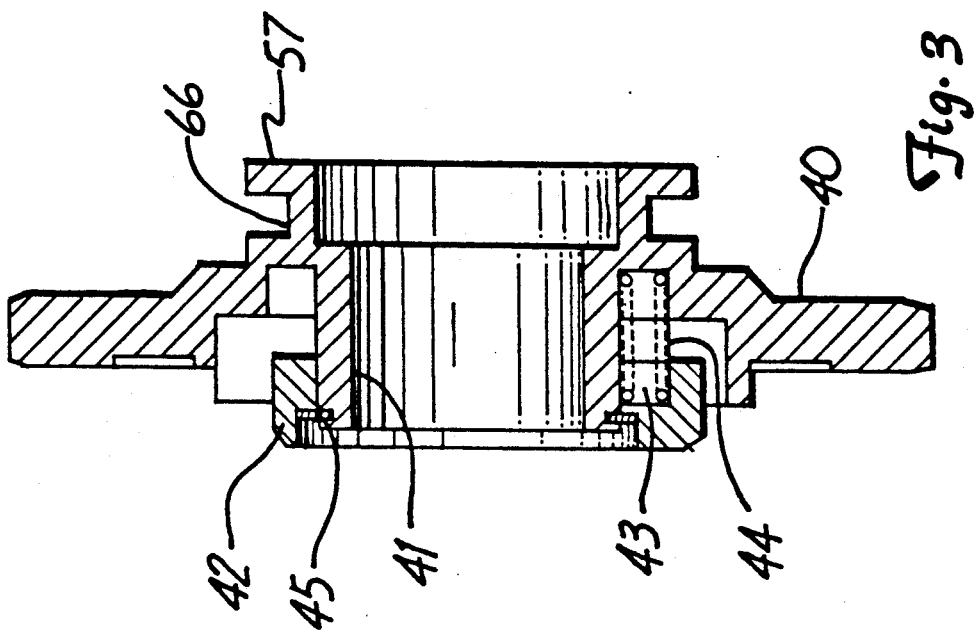
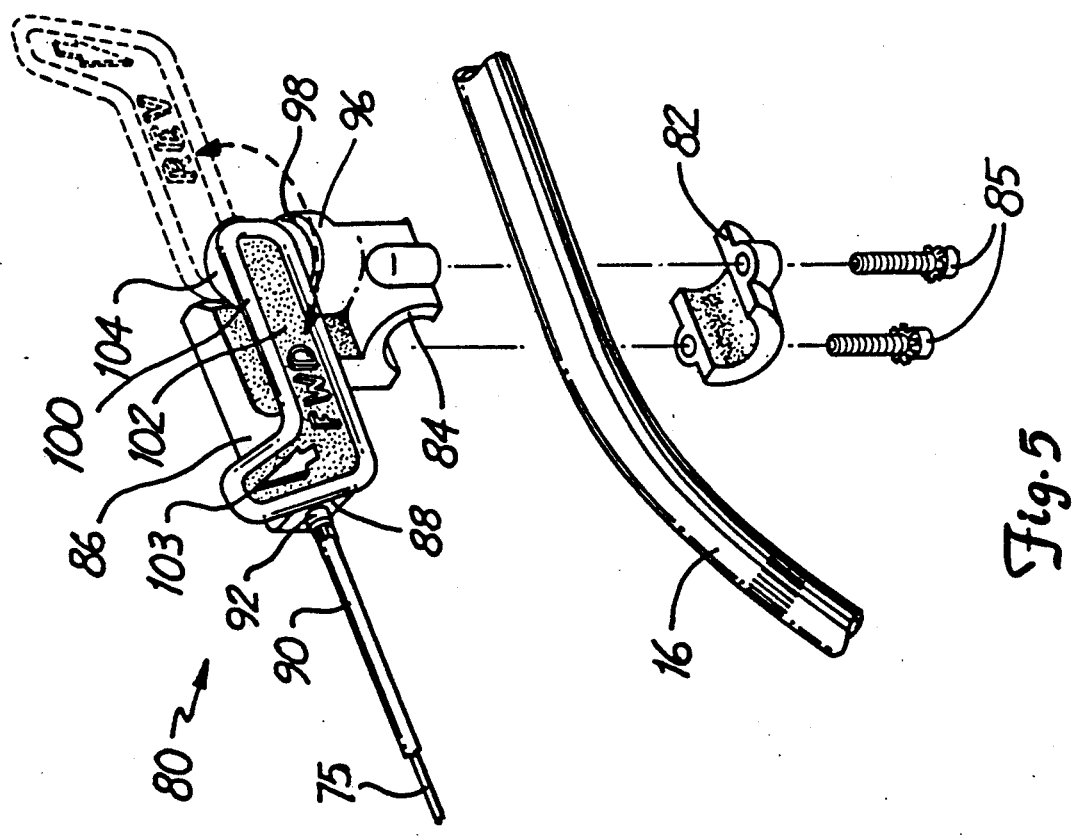

REVERSE-SHIFT MECHANISM FOR SNOWMOBILES

FIELD OF THE INVENTION

This invention relates to transmission controls for small vehicles such as snowmobiles, motorcycles, and the like, and particularly relates to reverse shift mechanisms for snowmobiles and all terrain vehicles.

BACKGROUND OF THE INVENTION

Snowmobiles have been widely used in this country and abroad for a number of years. They commonly employ an endless track driven by a continuously variable split-sheave clutch-type transmission which is well known in the art. The drive clutch of the transmission includes a drive axle operatively connected to an engine usually by means of a gear box transmission. The engine imparts rotation to an input shaft of the transmission which in turn drives the output shaft, or drive axle, which in turn propels the track.

This arrangement suffices when the operator only desires to go in a forward direction. However, if the driver wishes to back up the snowmobile, he or she often must manually push the vehicle backward because most snowmobiles are not provided with the capability of operating in reverse. Recently, some manufacturers have begun to market snowmobiles which can operate in reverse. The transmissions on such reversible-drive vehicles tend to be relatively cumbersome and difficult to operate, however. They typically are linked to the transmission by means of a direct mechanical shifting stick, necessitating location immediately adjacent the transmission. This placement can be somewhat awkward.

Most commonly, snowmobiles include handlebars grasped by the driver for steering the vehicle. The throttle and the brake controls are usually located on the handlebars. Snowmobile enthusiasts have grown accustomed to the ease of operation that this allows. Further, most critical operational indicators, such as the fuel gauge, speedometer, and the like, are desirably centrally positioned adjacent the handlebars just below the driver's line of vision so that they may be easily viewed. When a shift mechanism located adjacent the transmission is placed in reverse, however, there commonly is no indication of this condition within the operator's normal zone of vision. This can be unsafe if a driver accelerates in reverse when he or she is expecting to move in a forward direction or vice versa.

Accordingly, it would be desirable to provide a snowmobile which may be switched into reverse gear by control means located on the handlebars along with the other operational controls. Also, it would be desirable if a reverse gear indicator was placed within the driver's zone of vision to clearly inform the driver whether the vehicle is in forward or reverse mode.

SUMMARY OF THE INVENTION

The present invention comprises a snowmobile which may operate in reverse and has a shift lever conveniently located on the handlebars. In a preferred embodiment, this reverse shift lever includes means placed within the driver's zone of vision for clearly indicating when the drive mechanism is in reverse mode.

In one embodiment, the transmission of the vehicle includes a power transfer gear which is movable between a forward position wherein the transmission is in a forward condition, and a reverse position wherein the transmission is in a reverse condition. A shifting fork is attached to the gear and a cable gear extends from the shifting fork to a shift lever remotely located from the transmission, such as on the handlebars. The shift lever includes a lever arm attached adjacent the end of the cable. When the lever arm is moved between its forward and reverse positions, it moves the cable. The cable in turn moves the gear between its forward and reverse positions, controlling the directional condition of the transmission.

The power transfer gear may be spring biased toward its forward position. This would also bias the cable in the same direction, and in turn would urge the lever means toward the forward position—when released, it automatically returns to the forward position. Accordingly, the lever means may be provided with a mechanism for releasably locking the lever arm in its reverse position. In a preferred embodiment, the lever arm is retained in the reverse position when the cable is in an "over center" position where the lever arm is rotationally urged against an abutment of the lever means, thereby preventing the lever arm from inadvertently being switched into the forward position.

Additionally, the lever arm may include markings for indicating the directional condition of the transmission, with a forward indication being marked on one side of the lever arm and a reverse condition being marked on the other. When the lever arm is in either the forward or the reverse position, only the side of the lever arm corresponding to that position is visible from the perspective of the driver. By placing such an indicator on lever means mounted on the handlebars, the directional condition of the transmission is clearly displayed to the driver within his or her zone of vision.

DESCRIPTION OF THE DRAWINGS

FIG. 3 is a cross-sectional view of a portion of the transmission of FIG. 2;

FIG. 5 is a partially exploded perspective view of a shift lever of the invention showing how it is attached to the handlebars;

DETAILED DESCRIPTION

Figure 1:
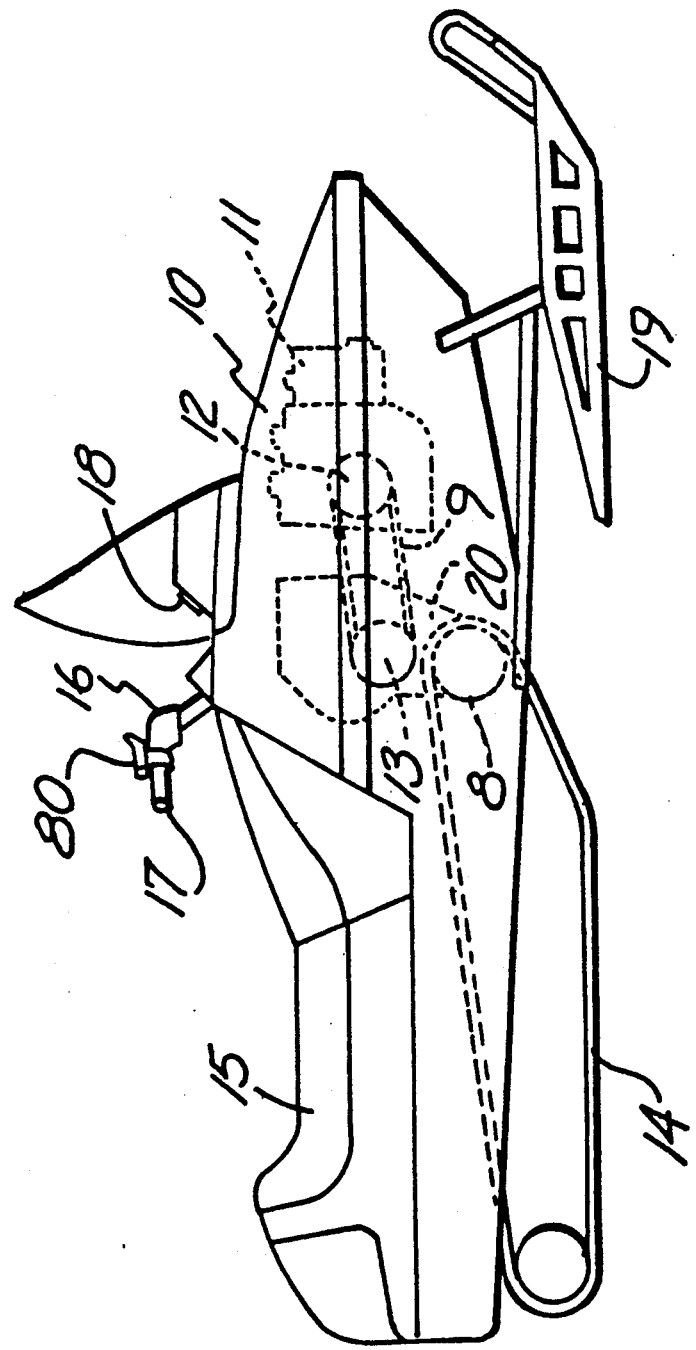
FIG. 1 is a side view of a snowmobile of the invention.

The transmission and transmission control mechanism of the present invention may be used in connection with a wide variety of snowmobile designs, but a preferred embodiment of the invention is shown in FIG. 1. In this embodiment, the snowmobile includes a hood (10) which substantially encloses an engine (11). The engine causes the drive clutch assembly (12) to rotate. The drive clutch assembly drives a belt (9), causing a driven clutch assembly (13) to turn. The driven clutch assembly casues a track drive wheel (8) to rotate via the transmission (20), as described in more detail in reference to FIG. 2. An endless track (14) in turn is driven by the track drive wheel to propel the snowmobile.

The snowmobile has a bench type seat (15) for the driver and handlebars (16) for steering and are carried forwardly of the seat. The handlebars should be positioned within arms length of the seat so the driver may comfortably grasp the end portions (17) of the handle while seated on the vehicle. The handlebars are affixed to a pivotable steering column (not shown) which extends generally downwardly from the handlebars to a pair of front-running skis (19). A lever means (80) is desirably attached to a portion of the handlebars and is capable of shifting the transmission between a forward condition and a reverse condition, as explained more fully below.

Figure 4:
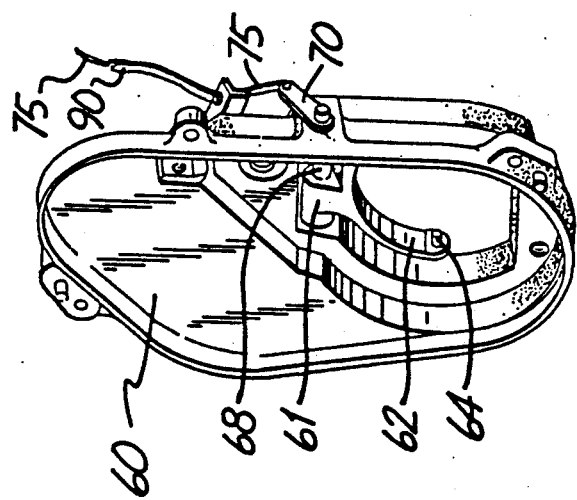
FIG. 4 is a perspective view of a portion of the transmission of FIG. 2.
Figure 2:
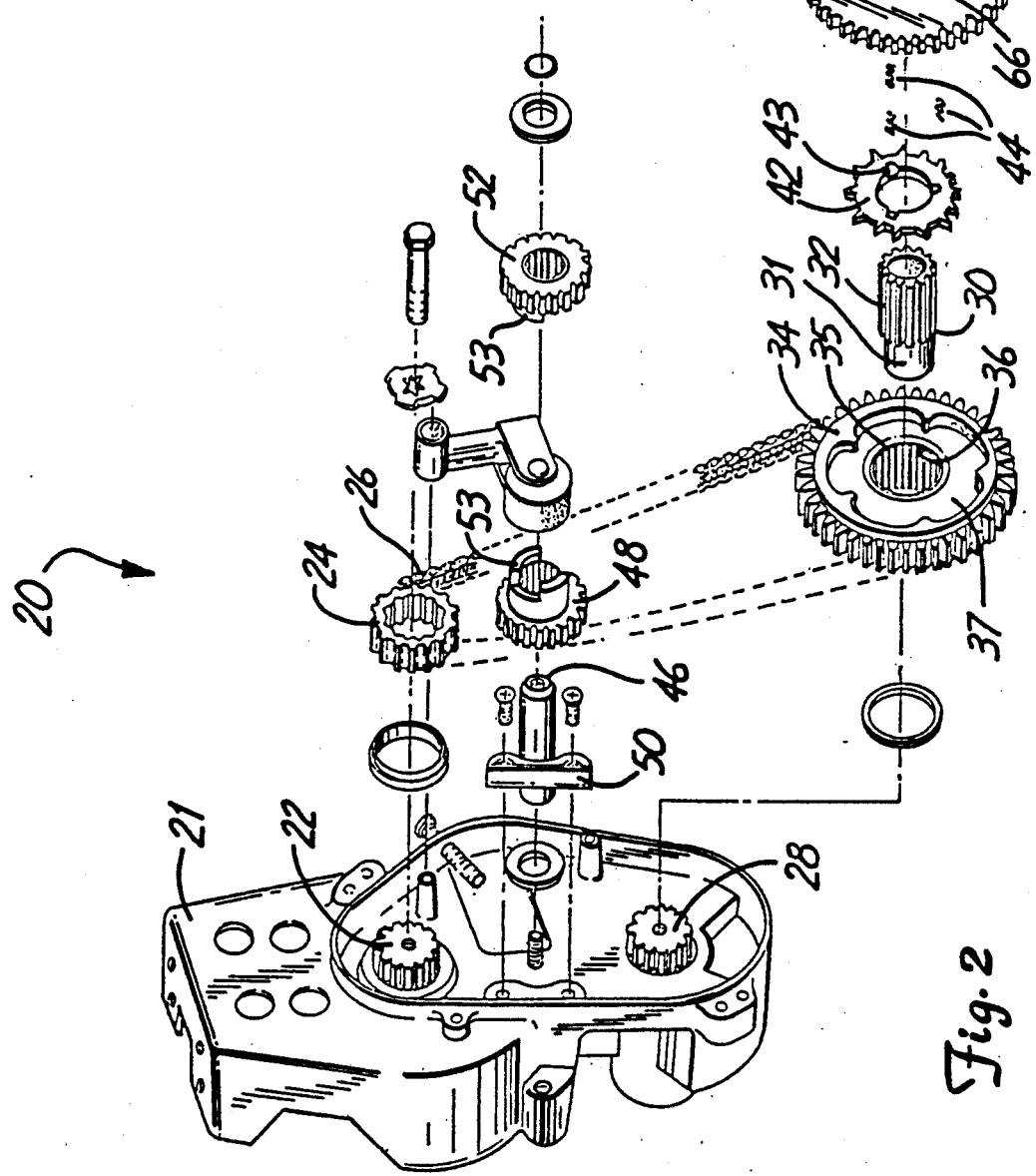
FIG. 2 is an exploded perspective view of a reversible transmission for use in the snowmobile of FIG. 1.

The transmission may be of any desired type as long as it may operate in reverse and may be moved between forward and reverse conditions by means of a cable control mechanism. A preferred embodiment of such a transmission is shown in FIGS. 2-4. The transmission may be attached to the engine (11 in FIG. 1) or vehicle chassis by means of shroud (21). An end portion of the input shaft (22) is rotatably retained in an aperture through the shroud. The input shaft is operatively connected to the engine via the drive and driven clutch assemblies (12, 13 in FIG. 1) such that the engine imparts rotation to the shaft. A chain drive gear (24) is affixed to the end portion of the input shaft in a manner preventing relative rotation between the two parts, such as by splining. The chain drive gear includes a plurality of radially extending teeth which engage a chain (26). As the chain drive gear is rotated, it drives the chain in the same direction.

An end portion of the output shaft (28) is rotatably retained in the shroud. A generally cylindrical coupler (30) is coaxially attached to the output shaft for rotation therewith. The coupler desirably includes a smooth segment (31) adjacent the end closest the output shaft. A chain idler gear (34) is rotatably carried about this smooth segment, such as by providing an aperture (35) in the chain idler gear and a plurality of needle bearings (36) or the like between the inner surface of this aperture and the exterior of the coupler. The chain, which is engaged by the chain drive gear (24), similarly engages radially extending teeth provided on the chain idler gear. Rotation of the chain drive gear causes the chain to move and in turn rotates the chain idler gear about the coupler in the same direction as the chain drive gear.

The coupler also includes a splined segment (32) disposed away from the shroud. A power transfer gear (40) is mounted on and axially slidable along the coupler. The coupler's splined segment mates with a complimentary inner surface of an aperture (41) centrally located in the power transfer gear such that rotation of the power transfer gear also causes the coupler to rotate.

A recess (37) may be provided in the face of the chain idler gear (34) disposed away from the shroud. The power transfer gear includes an engagement sprocket (42) coaxially affixed thereto which extends outwardly from the face closest the chain idler gear. This engagement sprocket and the recess are shaped to mate with one another such that when the two gears engage one another, rotation of the idler gear is imparted to the power transfer gear.

When the power transfer gear (40) so engages the chain idler gear (34), the transmission is in its forward condition. As explained above, the input shaft (22) turns the chain drive gear (24), causing the chain idler gear (34) to rotate in the same direction. The power transfer gear (40) rotates with the idler gear and in turn drives the coupler (30). The coupler is splined to the output shaft, so the output shaft also rotates in the same direction. Thus, the input and output shafts both turn in the same direction when the transmission is in its forward condition.

A generally cylindrical, elongated pinion shaft (46) is mounted in the shroud (21) at a position disposed between the input and output shafts. A chain pinion gear (48) is rotatably carried about the pinion shaft at a position adjacent the chain (26). The chain pinion gear engages one side of the chain, causing the pinion gear to rotate in the same direction as the chain drive gear. In order to ensure that the chain remains in engagement with the pinion gear during operation, a chain retention bracket (50) may be affixed to the shroud near the chain pinion gear. Space should be left between the retention bracket and the pinion gear to allow the chain to freely slide along the bracket while preventing the chain from moving away from the pinion gear and out of engagement therewith.

A spur pinion gear (52) is also rotatably mounted on the pinion shaft, but is disposed along the axis of the pinion shaft at a position spaced farther away from the shroud. The spur pinion gear is connected to the chain pinion gear for rotation therewith. The two gears may be integrally formed in a single piece or may be separate components, as shown. In either configuration, the outer diameter of the shaft (53) connecting the two gears is desirably smaller than the outer diameter of the spur pinion gear to avoid inadvertent contact with the power transfer gear.

The spur pinion gear is provided with radially extending teeth spaced to mate with similar teeth provided along the circumference of the power transfer gear. The transmission is in its reverse condition when the power transfer gear is spaced from the chain idler gear along the coupler and engages the spur pinion gear. As mentioned above, the chain pinion gear is driven by the chain in the same direction as the input shaft, so the spur pinion gear also turns in that same direction. The spur pinion gear rotates the power transfer gear in the opposite direction, however. Since the power transfer gear drives the output shaft via the coupler, the output shaft's rotation is opposite that of the input shaft when the transmission is in its reverse condition.

The transmission is desirably biased toward its forward condition. In a preferred embodiment, the power transfer gear (40) is biased toward the chain idler gear (34) by a spring (55) abutting the side of the power transfer gear disposed away from the idler gear. The power transfer gear may include a generally cylindrical spring engagement shoulder (57) against which the spring rests. A spring abutment (58) may be carried at a fixed location with respect to the chain idler gear to prevent movement of the spring away from the power transfer gear, urging the power transfer gear toward the chain idler gear.

In a preferred embodiment shown in cross section in FIG. 3, the engagement sprocket (42) includes a plurality of recesses (43) (desirably three) for receiving compression springs (44) carried between the sprocket (42) and the power transfer gear (40). The power transfer gear includes a keeper (45) or similar means for limiting axial movement of the sprocket (42) away from this gear (40). The spring engagement of these two gears ensures that the power transfer gear (40) can disengage from the spur pinion gear (52) even if the sprocket and the recess (37) in the chain idler gear are not in alignment. The force of the biasing spring (55) will urge the sprocket against the face of the chain idler gear. The compression springs (44) will be compressed by this force, allowing the power transfer gear to move closer to the chain idler gear and out of alignment with the spur pinion gear. When the chain (26) rotates the chain idler gear, the sprocket will align with the recess and the compression springs (44) will force the sprocket into engagement with the recess.

The transmission cover (60) shown in FIG. 4 is adapted to be attached to the shroud and encloses the moving parts of the transmission. A shifting fork (61) is carried by the cover and desirably includes a generally semi-circular portion ending in two arms (62). Inwardly protruding pins (64) are formed adjacent the ends of the arm. The spring engagement shoulder (57) of the power transfer gear desirably includes an annular groove (66) for receiving these pins. The pins should not tightly engage the power transfer gear, but rather should fit comfortably in the groove so that the power transfer gear may rotate freely with respect to the shifting fork.

The fork may be attached to the cover by a rod (68) which passes through the cover and is rotatably carried by the cover. A finger (70) is affixed to the rod and extends radially outwardly therefrom. A shift cable (75) is attached to the finger at a location disposed away from the rod. In its normal, forward position, the power transfer gear is adjacent the chain idler gear and the fork will be angled outwardly from the cover. Applying tension to the shift cable tends to turn the fork about the rod, causing the pins (64) to urge the power transfer gear away from the idler gear against the force of the spring (55). In this manner, one may move the power transfer gear along the coupler from its forward position to its reverse position wherein it engages the spur pinion gear. When tension of the shift cable is released, the spring (55) urges the power transfer gear out of its reverse position and into its forward position. Thus, the directional condition of the transmission may be controlled simply by applying or releasing tension on the shift cable.

Figure 6:
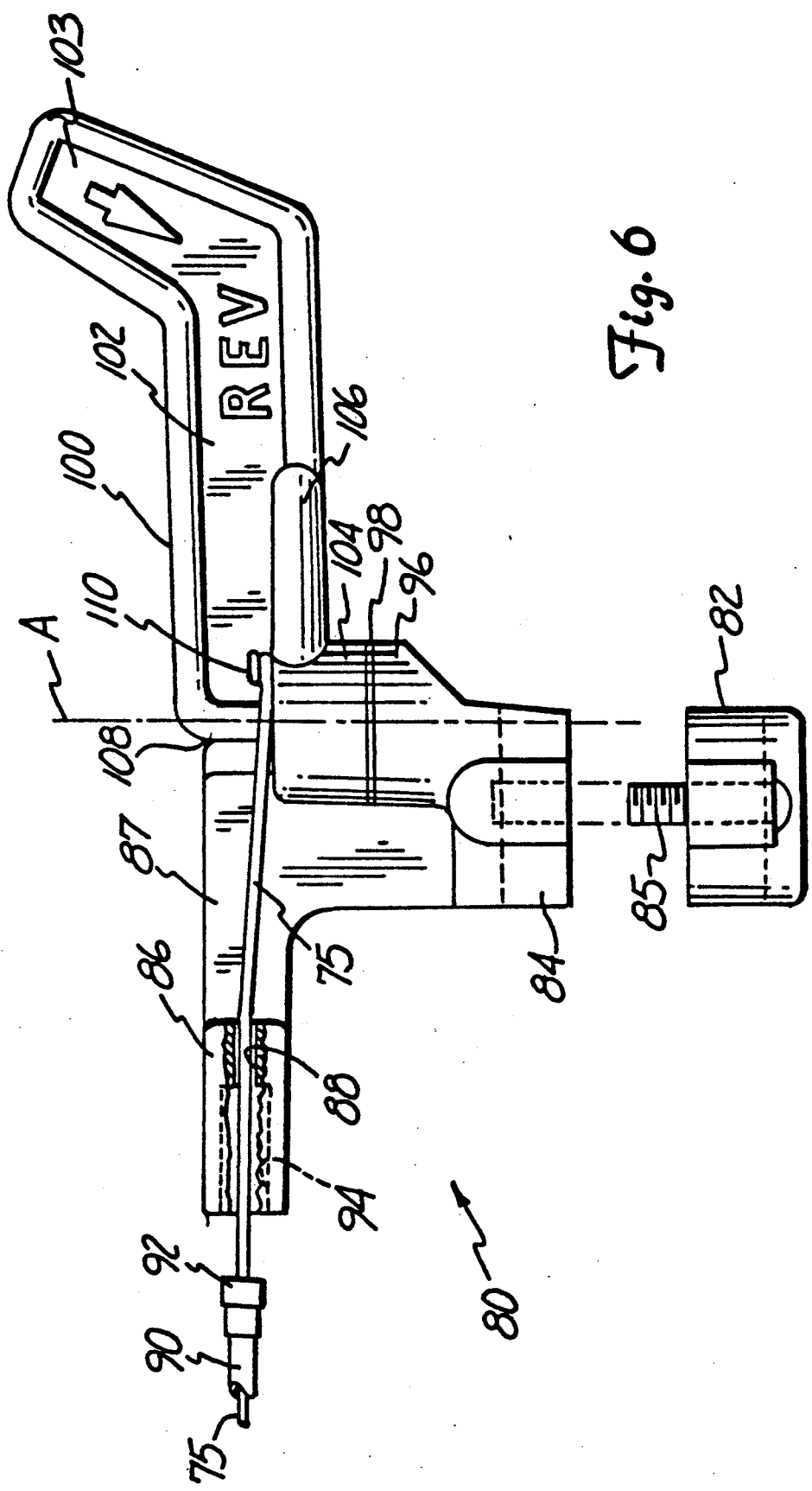
FIG. 6 is a partially exploded side view of the shift lever of FIG. 4.
Figure 7:
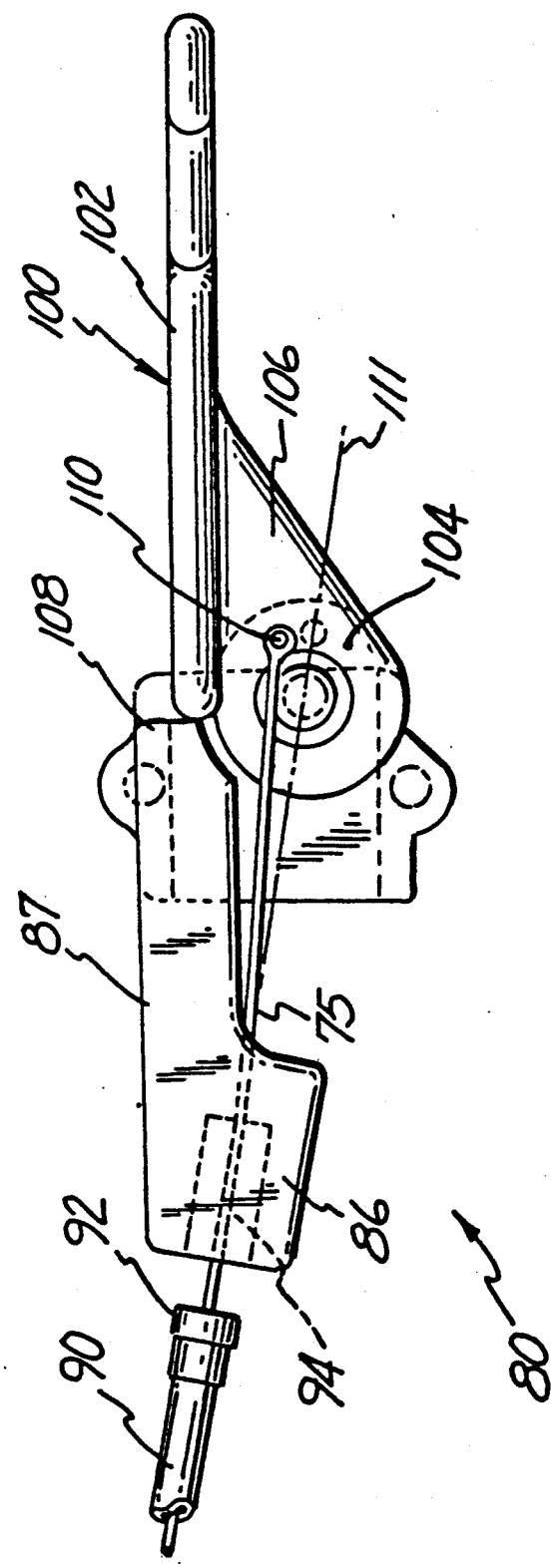
FIG. 7 is a top view of the shift lever of FIG. 5.

A reverse shift lever of the invention is shown in FIGS. 5-7. As mentioned above, one end of the shift cable is attached to the finger of the fork. The other end is attached to the shift lever. This permits a reverse shift mechanism of the invention to be located remotely of the transmission. In a preferred embodiment, the lever is located on the handlebars of the snowmobile, as shown in FIG. 1. A preferred means for attaching the lever to the handlebars is best seen in FIG. 5. The lever includes an attachment clamp comprising a separate, generally C-shaped bottom bracket (82) and a similarly shaped upper bracket (84) which is integrally formed with the rest of the lever. These brackets may be positioned on opposite sides of the handlebar (16) and bolts (85) extending from one bracket to another may be used to tightly clamp the handlebar between the brackets.

The lever desirably includes a cable guide (86) attached to the upper bracket for slidably retaining a portion of the cable. Desirably, this cable guide is spaced away from the upper bracket and may be formed as part of an L shaped extension (87) which is integrally formed with the upper bracket. This guide may take any desired shape, such as a bore which completely encircles the cable. Preferably, however, the guide includes a slot (88, best seen in FIG. 5) which only encloses three sides of the cable. The cable is desirably provided with a flexible protective sheath (90) which extends from the cable guide to a position adjacent the finger (70) of the transmission's shifting fork. A relatively rigid end member (92) is affixed to the end of the sheath closest to the shift lever and may be retained in a circular recess (94) in the cable guide. The diameter of the end member should be larger than the width of the slot (88) so that the end member prevents the cable from slipping out of the slot.

A pivot platform (96) is integrally formed with and extends upwardly from the upper bracket (84). This platform is desirably generally circular in cross section and has an axis which is spaced away from the cable guide. A lever arm (100) is attached to the pivot platform and is pivotable about a pivot axis (designated as A in FIG. 6) which substantially coincides with the axis of the platform. The lever arm comprises a planar member (102) spaced radially outwardly from the pivot axis and a generally circular pivot member (104). Desirably, the diameter of the pivot member and the pivot platform are substantially equal, as shown. A nylon washer (98) or the like may be positioned between the pivot platform and the pivot member. A structural support member (106) may extend between the pivot member and the planar member to improve rigidity and durability of the lever arm.

In the embodiment shown in FIGS. 5-7, the cable guide is shaped to abut the lever arm and prevent further rotation about the pivot axis in a clockwise direction in FIG. 7. This position of the lever arm is depicted in FIG. 5. Rotation in the other direction, i.e., a counterclockwise direction in FIG. 7, is limited by an abutment (108) which may comprise a portion of the L-shaped extension (87). Desirably, this abutment is positioned such that the L-shaped extension and the planar member generally lie within the same plane when the lever arm engages the abutment. This second position is shown in phantom lines in FIG. 5.

The planar member may include a flange (103) which extends above the cable guide when the lever arm engages the cable guide. This allows the snowmobile operator to grasp the lever arm and turn it toward the position wherein it engages the abutment (108).

The end of the shift cable (75) is pivotally attached to a pivot pin (110) secured to the pivot member of the lever arm. The pin (110) is located at a position spaced radially outwardly from the pivot axis (A) of the lever arm. As the lever arm is turned about its pivot axis, the distance from the pivot pin to the cable guide will vary. The pin should be positioned on the pivot member (104) such that when the lever arm engages the cable guide, the pivot pin is closer to the cable guide than when the arm engages the abutment (108) at the other end of its rotational range. This results in a minimum tension on the cable when the lever arm is in the position shown in FIG. 5. The cable should be long enough to allow the power transfer gear (40) of the transmission to slide into its forward position when the lever arm is against the cable guide; this position defines the forward position of the lever arm.

When the lever arm is rotated out of this position, tension is applied to the shift cable. When the lever arm has rotated a certain angular distance, the cable will be moved sufficiently to urge the power transfer gear into its reverse position wherein it engages the spur pinion gear (52); this corresponds to the reverse position of the lever arm. However, tension remains on the cable from the biasing spring (55) of the transmission, so the cable will generally tend to pull the lever arm back into its forward position. Accordingly, means for releasably retaining the lever arm in its reverse position should be provided on the shift lever.

A preferred embodiment utilizes the tension on the cable to retain the arm in its reverse position. The "center" position of the cable's pivot pin is defined as the position wherein a line (111 in FIG. 7) from the pivot pin to the center of the cable in the cable guide passes through the pivot axis. When in the center position, the tension force on the cable will not cause the lever arm to turn because the tangential component of that force is zero. When the pivot pin is moved to either side of that line, it may cause the lever arm to rotate. Thus, when the pivot pin is in an "under center" position, i.e., when the lever arm is rotated clockwise in FIG. 6 from the center position, the lever arm will tend to return to its forward position.

The reverse position of the lever arm is actually a range of rotation defined at one end by a position wherein the lever arm engages the abutment (108) and at the other end by a position wherein the pivot pin is in its center position. When the lever arm is in this "over center" position, the tangential force exerted on the lever arm by the shift cable urges the lever arm in a counterclockwise direction in FIG. 6. The abutment (108) prevents further rotation of the lever arm about its pivot axis and the tension on the cable holds the lever arm firmly against the abutment. This maintains the transmission in its reverse condition until the lever arm is manually rotated toward its forward position and out of this over center range.

As mentioned above, reverse shift mechanisms known in the art employ a stick shift directly linked to the transmission to shift between forward and reverse positions. Due to their direct mechanical connections, these shift levers commonly must be placed immediately adjacent the transmission. When an individual operates a snowmobile, he or she commonly looks forward to see the path ahead. For this reason, indicators of important operational conditions, such as the speedometer and fuel gauge, are commonly located on a display panel (18 in FIG. 1) carried in front of the driver. This display panel places the information within the driver's normal zone of vision, i.e., he or she can readily see the information without diverting his or her view from the front of the vehicle. With a reverse shift mechanism known in the art, there commonly is no indication of the directional condition of the transmission placed within the operator's normal zone of vision. Instead, the driver must look down at the stick shift to discern whether the snowmobile will move forwardly or rearwardly. This can be unsafe if a driver accelerates, expecting to go forward and instead moves in reverse.

In order to avoid this situation, a preferred embodiment of the present invention includes indicator means on the shift lever to inform the driver of the directional condition of the transmission. Since the shift lever is desirably located on the handlebars (16), as shown in FIG. 1, such an indication of direction would be within the driver's normal zone of vision. As shown in FIGS. 5-7, this indicator means may simply comprise letters, such as "FWD" to indicate the forward position and "REV" to indicate the reverse condition, carried on the lever arm. Desirably, the letters indicating the two different directions are carried on opposite faces of the lever arm. In this manner, only the letters corresponding to the actual directional condition of the transmission will be displayed toward the operator. As shown in FIG. 5, when the lever arm is in its forward position, only the letters "FWD" face the driver; the other side of the lever arm faces the cable guide (86) and may not readily be viewed. When the shift lever is moved into its reverse position, indicated by phantom lines in FIG. 5, only the face bearing the letters "REV" faces the driver. The face visible when the lever arm is in its forward position is disposed toward the front of the snowmobile and away from the operator.

In a particularly preferred embodiment, an arrow is provided on each side of the flange (103) of the lever arm. When the lever arm is in its forward position, this arrow is oriented to point generally forwardly. This clearly indicates to the driver in a readily understandable visual manner that the snowmobile will move forwardly when power is supplied to the engine. Similarly, the opposite face of the lever arm includes an arrow on the flange pointing in the opposite direction, giving a simple visual indication to the operator that the vehicle will move in reverse.

Thus, a snowmobile of the present invention includes a shift lever which may be located away from the transmission and within easy reach of the driver, such as on the handlebars. Further, this invention provides an inexpensive, reliable indicator of the directional condition of the transmission which is placed in a readily viewable position.

While a preferred embodiment of the present invention has been described, it should be understood that various changes, adaptations and modifications may be made therein without departing from the spirit of the invention and the scope of the appended claims.

What is claimed is:
1. A snowmobile comprising:
means for steering the snowmobile including handlebars;
an endless rotatable track for propelling the snowmobile;
an engine;
a transmission having an input shaft driven by the engine and an output shaft for driving the track, the transmission including gear means shiftable from a forward condition to a reverse condition for driving the output shaft in the desired direction; and
a shift cable mechanism including a cable having first and second ends, the first end being operatively connected to the transmission, and lever means attached to the second end of the cable, the lever means including a lever arm having first and second sides which is movable from a first, forward position displaying the first side to a second, reverse position displaying the second side for moving the cable to shift the transmission from the forward condition to the reverse condition.

2. The snowmobile of claim 1 wherein the gear means includes a rotatable power transfer gear axially movable between a first position engaging the input shaft in the forward condition and a second position engaging the input shaft in the reverse condition, the power transfer gear being operatively connected to the first end of the cable.

3. The snowmobile of claim 2 including spring means for biasing the power transfer gear toward the first, forward condition so that when tension on the cable is released the power transfer gear is urged into the forward position.

4. The snowmobile of claim 1 wherein the lever means comprises mounting means for securing the lever means to the handlebars; a lever arm pivotally attached to the mounting means and being pivotable about a pivot axis between a first position defining the forward position of the lever means and a second position defining the reverse position of the lever means, the cable being pivotally attached to the lever arm at a position disposed away from the pivot axis; and a cable guide disposed between the transmission and the pivot arm for slidably retaining the cable.

5. The snowmobile of claim 4, wherein the lever means further includes means for locking the lever arm in its second position.

6. The snowmobile of claim 4, wherein the gear means of the transmission is biased toward the forward condition, and the lever means includes an abutment for limiting rotation of the lever arm in the direction from its first, forward position to its second, reverse position.

7. The snowmobile of claim 6, wherein the second position of the lever arm is defined by an over-center range between a position wherein the lever arm engages the abutment and a position where a line drawn from the cable guide to the point at which the cable is attached to the lever arm passes substantially through the pivot axis.

8. The snowmobile of claim 4 wherein the lever means further comprises indication means for indicating whether the transmission is in the forward condition of the reverse condition.

9. The snowmobile of claim 1 wherein the first side of the lever arm includes an indicator indicating a forward condition and the second side of the lever arm includes an indicator indicating a reverse condition.

10. A snowmobile comprising:
means for steering the snowmobile including handlebars;
an endless rotatable track for propelling the snowmobile;
an engine;
a transmission having an input shaft driven by the engine and an output shaft for driving the track, the transmission including gear means shiftable from a forward condition to a reverse condition for driving the output shaft in the desired direction; and
a shift cable mechanism including a cable having first and second ends, the first end being operatively connected to the transmission; and
lever means comprising mounting means for securing the lever means to the handlebars; a lever arm having first and second sides pivotally attached to the mounting means and being pivotable about a pivot axis between a first position displaying the first side and defining a forward position of the lever means and a second position displaying the second side of the lever arm and defining a reverse position of the lever means, the second end of the cable being pivotally attached to the lever arm at a position disposed away from the pivot axis; indication means for indicating whether the transmission is in the forward condition of the reverse condition; and a cable guide disposed between the transmission and the pivot arm for slidably retaining the cable.

11. The snowmobile of claim 10 wherein the first side of the lever arm includes an indicator indicating a forward condition and the second side of the lever arm includes an indicator indicating a reverse condition.

12. A snowmobile comprising:
means for steering the snowmobile including handlebars;
an endless rotatable track for propelling the snowmobile;
an engine;
a transmission having an input shaft driven by the engine and an output shaft for driving the track, the transmission including gear means shiftable from a forward condition to a reverse condition for driving the output shaft in the desired direction, the gear means being biased toward the forward condition;
a shift cable mechanism including a cable having first and second ends, the first end being operatively connected to the transmission;
lever means having a first and a second side including mounting means for securing the lever means to the handlebars; a lever arm pivotally attached to the mounting means, the second end of the cable being pivotally attached to the lever arm at a position disposed away from the pivot axis; the lever arm being pivotable between a first, forward position displaying said first side, and a second, reverse position displaying said second side, for moving the cable to shift the transmission from the forward condition to the reverse condition; a cable guide disposed between the transmission and the pivot arm for slidably retaining the cable; and an abutment for limiting rotation of the lever arm in the direction from its forward position to its reverse position, the reverse position being defined by an over-center range between a position wherein the lever arm engages the abutment and a position where a line drawn from the cable guide to the point at which the cable is attached to the lever arm passes substantially through the pivot axis.

* * * * *